United States Patent
Li et al.

(10) Patent No.: US 10,728,803 B2
(45) Date of Patent: Jul. 28, 2020

(54) ADAPTIVE AND PROACTIVE FEEDBACK FOR POWER AND PERFORMANCE OPTIMIZATION

(71) Applicant: APPLE INC., Cupertino, CA (US)

(72) Inventors: Yang Li, Plano, TX (US); Zhu Ji, San Jose, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/055,763

(22) Filed: Aug. 6, 2018

(65) Prior Publication Data

US 2019/0045400 A1 Feb. 7, 2019

Related U.S. Application Data

(60) Provisional application No. 62/541,974, filed on Aug. 7, 2017.

(51) Int. Cl.
| | |
|---|---|
| *H04W 28/20* | (2009.01) |
| *H04L 5/00* | (2006.01) |
| *H04B 17/309* | (2015.01) |
| *H04L 1/00* | (2006.01) |
| *H04W 24/10* | (2009.01) |
| *H04B 7/06* | (2006.01) |

(52) U.S. Cl.
CPC .......... *H04W 28/20* (2013.01); *H04B 7/0626* (2013.01); *H04B 17/309* (2015.01); *H04L 1/0026* (2013.01); *H04L 5/0005* (2013.01); *H04L 5/006* (2013.01); *H04L 5/0048* (2013.01); *H04L 5/0064* (2013.01); *H04L 5/0085* (2013.01); *H04W 24/10* (2013.01); *H04L 5/0039* (2013.01); *H04L 5/0057* (2013.01); *H04L 5/0091* (2013.01)

(58) Field of Classification Search
CPC ..................................................... H04W 28/20
USPC ......................................................... 370/329
See application file for complete search history.

(56) References Cited

U.S. PATENT DOCUMENTS

| 10,251,066 | B2* | 4/2019 | Xu | H04W 16/14 |
|---|---|---|---|---|
| 2017/0019911 | A1* | 1/2017 | Rico Alvarino | H04B 3/36 |
| 2018/0359760 | A1* | 12/2018 | Su | H04W 72/082 |
| 2019/0174327 | A1* | 6/2019 | You | H04W 4/70 |
| 2019/0223186 | A1* | 7/2019 | Liu | H04W 72/08 |
| 2019/0239241 | A1* | 8/2019 | Rico Alvarino | H04W 72/121 |

* cited by examiner

*Primary Examiner* — Peter G Solinsky
(74) *Attorney, Agent, or Firm* — Fay Kaplun & Marcin, LLP

(57) ABSTRACT

A method performed by a user equipment (UE) connected to a network that utilizes a first bandwidth for a plurality of network operations and assigns the UE a second bandwidth, within the first bandwidth, to utilize for communication with the network. The method including determining a third bandwidth within the first bandwidth that is narrower than the first bandwidth and wider than the second bandwidth and includes the second bandwidth, monitoring the third bandwidth for at least one reference signal transmitted by the network, and determining at least one value that corresponds to the connection between the UE and the network based on the at least one reference signal.

20 Claims, 5 Drawing Sheets

ADAPTIVE AND PROACTIVE FEEDBACK FOR POWER AND PERFORMANCE OPTIMIZATION

PRIORITY/INCORPORATION BY REFERENCE

This application claims priority to U.S. Provisional Application 62/541,974 entitled "Apparatus, Systems and Methods for Adaptive and Proactive Feedback for Power and Performance Optimization," filed on Aug. 7, 2017, the entirety of which is incorporated herein by reference.

BACKGROUND

A user equipment (UE) may be configured to establish a connection to at least one of a plurality of different networks or types of networks to perform a variety of different functionalities via the network connection. For example, the UE may communicate with another UE through the network connection. In another example, the UE may communicate with various servers to exchange data.

A UE and a network may communicate over a particular bandwidth range. For instance, a UE may communicate with a network via a base station and the base station may be configured to provide a 20 MHz bandwidth range for communications. A bandwidth range may be referred to as a band and may be categorized as a wideband or a narrowband. A band may include a plurality of subbands. Wideband operations may utilize a larger band (e.g. 20 MHz, 10 MHz, etc.) compared to narrowband operations and, in some examples, the wideband may be equivalent to the entire bandwidth range available. Again, in some examples, narrowband operations may utilize a 1.4 MHz band. Depending on system conditions, there may be a plurality of narrowband regions defined within the available bandwidth range. Since wideband operations utilize a larger band compared to narrowband operations, wideband operations may transport more data than narrowband operations. However, utilizing a larger band correlates to an increase in the amount of power consumed by the UE. In contrast, utilizing a smaller band may conserve power but less data may be transported.

Certain devices may prefer to avoid the power cost of utilizing wideband operations and may elect to utilize narrowband operations. For example, in 3GPP Release 13, enhanced MTC (eMTC) or Category-M1 devices are introduced and may utilize a narrowband, in uplink and downlink communications, that has a range of 1.4 MHz (e.g. a six resource block (RB) narrowband).

After a UE has established a connection with the network, the UE may be instructed to provide Channel State Information (CSI) feedback to the network. CSI may indicate the quality of a communication channel between the UE and the network. A UE determines the CSI based on reference signals transmitted by a base station. The UE performs measurements on the reference signals and subsequently makes determinations to generate CSI feedback. The type of CSI feedback to be provided is typically determined by the network and may be categorized as periodic CSI feedback or aperiodic CSI feedback. Periodic CSI feedback may refer to a CSI report that is transmitted periodically with a specified time interval between transmissions. Aperiodic CSI feedback may refer to a CSI report that is triggered by a specific occurrence. CSI feedback may be used to determine subsequent scheduling for communications between the UE and the network.

When generating CSI feedback during narrowband operations, a UE may initially evaluate the CSI. In legacy approaches, CSI evaluation during narrowband operations may include 1) only evaluating the CSI over the scheduled narrowband or 2) evaluating the CSI of the entire bandwidth range available. Only evaluating CSI over the scheduled narrowband reduces radio frequency (RF) and computation power for the current CSI evaluation. However, it may jeopardize future power and performance because it may require more repetitions and retransmissions and the limited number of reference signals within the narrowband may degrade CSI feedback accuracy. On the other hand, evaluating the CSI of the entire band may significantly improve future power and performance at the cost of increasing power for the current CSI evaluation.

SUMMARY

In some exemplary embodiments, a method performed by a user equipment (UE) connected to a network that utilizes a first bandwidth for a plurality of network operations and assigns the UE a second bandwidth, within the first bandwidth, to utilize for communication with the network is described. The method includes determining a third bandwidth within the first bandwidth that is narrower than the first bandwidth and wider than the second bandwidth and includes the second bandwidth, monitoring the third bandwidth for at least one reference signal transmitted by the network, and determining at least one value that corresponds to the connection between the UE and the network based on the at least one reference signal.

In other exemplary embodiments, a UE is described that includes a transceiver configured to establish a connection with a cell of a network that utilizes a first bandwidth for a plurality of network operations and assigns the UE a second bandwidth, within the first bandwidth, to utilize for communication with the network. The UE also includes a baseband processor connected to the transceiver and configured to determine a third bandwidth within the first bandwidth that is narrower than the first bandwidth and wider than the second bandwidth and includes the second bandwidth, monitor the third bandwidth for at least one reference signal transmitted by the network and determine at least one value that corresponds to the connection between the UE and the network based on the at least one reference signal.

In still further exemplary embodiments, an integrated circuit is described that is included in a user equipment (UE) that has established a connection with a network that utilizes a first bandwidth for a plurality of network operations and assigns a second bandwidth, within the first bandwidth, to utilize for communication between the UE and the network. The integrated circuit includes circuitry to determine a third bandwidth within the first bandwidth that is narrower than the first bandwidth and wider than the second bandwidth and includes the second bandwidth, circuitry to monitor the third bandwidth for at least one reference signal transmitted by the network and circuitry to determine at least one value that corresponds to the connection with the network based on the at least one reference signal.

DETAILED DESCRIPTION

Figure 1:
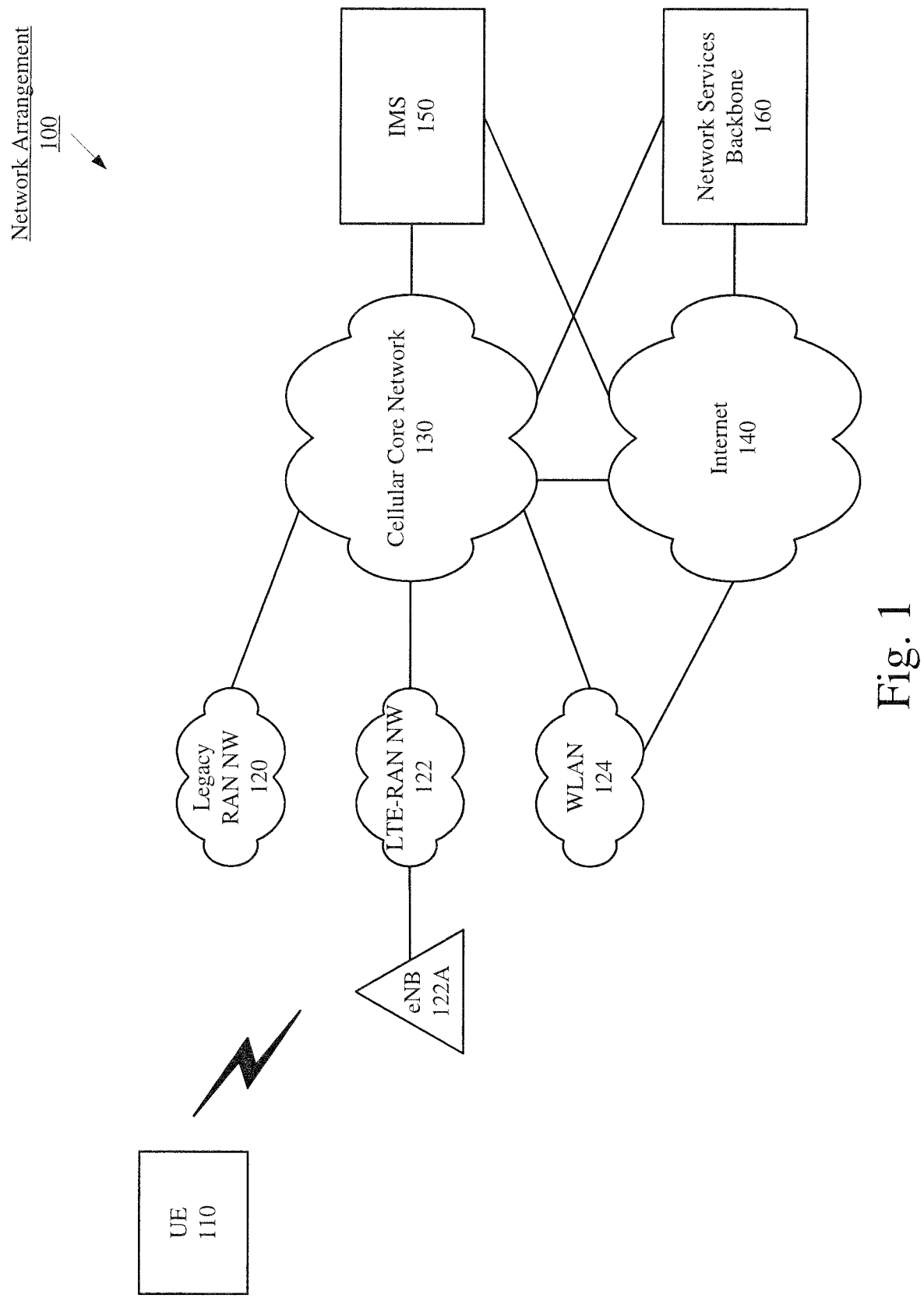
FIG. 1 shows a network arrangement according to the various exemplary embodiments described herein.

The exemplary embodiments may be further understood with reference to the following description and the related appended drawings, wherein like elements are provided with the same reference numerals. The exemplary embodiments are related to a device, system, and method for adaptive and proactive UE CSI feedback for power and performance optimization. Specifically, the exemplary embodiments may address the above noted deficiencies of conventional systems by adaptively determining the bandwidth to use for CSI evaluation. Subsequently, the UE generates the corresponding CSI feedback in accordance with the type of CSI feedback the UE may be instructed to provide and the type of communication channel to be used to provide the CSI feedback.

Initially, it is noted that the exemplary embodiments are described with regard to a UE. However, the use of a UE is merely for illustrative purposes. The exemplary embodiments may be utilized with any electronic component that may establish a connection with a network and configured with the hardware, software, and/or firmware to perform certain operations such as demodulation, decoding, channel estimation, etc. Therefore, the UE as described herein is used to represent any electronic component.

Further, it is noted that the exemplary embodiments are described with regard to the network being an LTE network and the base station of the network being an evolved Node B (eNB). However, it should be noted that the use of the LTE network and the eNB is merely for illustrative purposes. Those skilled in the art will understand that the network may be any network and the base station may be any type of base station within the corresponding network.

The exemplary embodiments may be described with regard to Channel State Information (CSI). However, reference to CSI is merely for illustrative purposes and different networks may refer to information regarding the state of the communication medium between the UE and the network in a different manner. Further, the exemplary embodiments are described with reference to either periodic CSI feedback or aperiodic CSI feedback. The type of CSI feedback may be determined during a connection establishment procedure, through the exchange of control information or through any other exchange of information between the UE and the network prior to the occurrence of transmitting the CSI feedback. Periodic CSI feedback may refer to a CSI report that is transmitted periodically with a specified time interval between transmissions. Aperiodic CSI feedback may refer to a CSI report that is triggered by a specific occurrence. However, reference to periodic CSI feedback and aperiodic CSI feedback is merely for illustrative purposes and a different network may refer to scheduled CSI feedback and triggered CSI feedback in a different manner.

The exemplary embodiments provide a solution to the above noted deficiencies by adaptively determining the bandwidth for CSI evaluation. Regarding periodic CSI feedback, in legacy approaches periodic CSI feedback is determined based on receiving the entire band. Utilizing the entire band to perform CSI measurements may provide accurate measurements but power may be wasted monitoring and measuring portions of the entire band that are unlikely to be used in subsequent eNB scheduling. The exemplary embodiments address these deficiencies by initially determining a bandwidth range that is than the entire band for monitoring and measurement. The UE makes this determination by using a predetermined threshold that indicates whether a bandwidth range maintains sufficient CSI accuracy. Subsequently, the UE monitors and measures the determined bandwidth range for CSI evaluation and then generates the corresponding periodic CSI feedback.

Regarding aperiodic CSI feedback, initially it should be noted that aperiodic CSI feedback may include subband reporting which enables a UE to indicate a preferred subband for eNB scheduling within the CSI feedback. In legacy approaches, a UE may monitor and measure the subbands within the entire band and waste power monitoring, measuring and reporting on subbands that are unlikely to be used in subsequent eNB scheduling. In an alternative legacy approach, the UE may monitor and measure subbands only within the scheduled narrow band. This may jeopardize future power and performance because monitoring and measuring only the scheduled narrowband provides limited reference signals which degrades measurement accuracy. Narrowband operations may use more repetitions and more retransmissions which may waste power and the UE may not select the preferred or optimal subband for subsequent eNB scheduling. The exemplary embodiments address these deficiencies by initially determining a bandwidth range to monitor based on a comparison to a predetermines power optimization threshold and a predetermined performance (e.g., throughput) threshold. Subsequently, the UE monitors and measures the determined bandwidth range for CSI evaluation and then generates the corresponding aperiodic CSI feedback.

FIG. 1 shows an exemplary network arrangement 100 according to the exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Cat-M devices, Cat-M1 devices, MTC devices, eMTC devices, etc. It should also be understood that an actual network arrangement may include any number of UEs being used by any number of users. Thus, the example of a single UE 110 is merely provided for illustrative purposes.

The UE 110 may be configured to communicate directly with one or more networks. In the example, the networks with which the UE may wirelessly communicate are a legacy radio access network (RAN) 120, a LTE radio access network (LTE-RAN) 122 and a wireless local access network (WLAN) 124. However, it should be understood that the UE 110 may also communicate with other types of networks and the UE 110 may also communicate with networks over a wired connection. With regards to the exemplary embodiments, the UE 110 may establish a connection with the LTE-RAN 122. For example, the UE 110 may have a LTE chipset and communicate with the LTE-RAN 122. However, it should be noted that the use of the LTE-RAN 122 is merely for illustrative purposes and the exemplary embodiments may utilize any type of network.

The legacy RAN 120 and the LTE-RAN 122 may be portions of cellular networks that may be deployed by cellular providers (e.g., Verizon, AT&T, Sprint, T-Mobile, etc.). These networks 120 and 122 may include, for example, base stations (Node Bs, eNodeBs, HeNBs, GNBs, etc.) that are configured to send and receive traffic from UEs that are equipped with the appropriate cellular chip set. The WLAN 124 may include any type of wireless local area network (WiFi, Hot Spot, IEEE 802.11x networks, etc.).

In addition to the networks 120-124, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

The exemplary embodiments relate to the UE 110 connecting to the LTE-RAN 122 via an evolved Node B (eNB) 122A. As mentioned above, the use of the LTE-RAN 122 is for illustrative purposes and any type of network may be used. Those skilled in the art will understand that any association procedure may be performed for the UE 110 to connect to the LTE-RAN 122. For example, as discussed above, the LTE-RAN 122 may be associated with a cellular provider where the UE 110 and/or the user thereof has a contract and credential information (e.g., stored on a SIM card). Upon detecting the presence of the LTE-RAN 122, the UE 110 may transmit the corresponding credential information to associate with the LTE-RAN 122. More specifically, the UE 110 may associate with a specific access point (e.g., the eNB 122A of the LTE-RAN 122).

The eNB 122A may be configured to determine the parameters of data exchange with the UE 110 through scheduled data transmissions defined using control information. For example, the eNB 122A may transmit scheduling information for data exchange via a CAT-M1 physical downlink control channel (MPDCCH) and the UE 110 may transmit data corresponding to the scheduling information via a physical uplink control channel (PUCCH) or a physical uplink shared channel (PUSCH). However, the exemplary embodiments may be configured to utilize any type of communication channel.

When receiving data from the eNB 122A (both control information and other types of data), the UE 110 may receive reference signals that are present in the band associated with the network and/or base station and may occur in each transmission time interval (TTI). Using the reference signals, a variety of network parameters may be measured by the UE 110. The eNB 122A may broadcast reference signals during each TTI, whether or not there is data scheduled to be exchanged with the UE 110. Accordingly, the UE 110 may receive reference signals when monitoring for them.

The UE 110 may be assigned a narrowband within the overall bandwidth for the UE 110 to monitor. For example, in the 3GPP Release 13, enhanced MTC (eMTC) or Category-M1 devices are introduced for power efficient and overage limited operation. Specifically, in one example, narrowband operations reduce the overall monitored bandwidth to 1.4 MHz (e.g., a 6 resource block (RB) narrowband). The exemplary embodiments will be described with reference to this type of narrowband operations. However, the use of 1.4 MHZ is merely exemplary and the UE 110 may be configured for any type of narrowband operations.

Narrowband operations utilize a smaller band compared to wideband operations and thus, a limited number of reference signals may be available. Those skilled in the art will understand that a limited number of reference signals may adversely affect measurement accuracy and consequently, CSI feedback accuracy. For example, the reference signals may be used for channel estimation, in measuring parameters used for filter coefficients of channel estimation (e.g., delay spread, Doppler spread, etc.), in measuring various network parameters (e.g., reference signal received power (RSRP), received signal strength indicator (RSSI), reference signal received quality (RSRQ), channel state information (CSI), channel quality indicator (CQI), rank indicator (RI), precoding matrix indicator (PMI), etc.). Fewer reference signals may result in less reliable and/or inadequate measurements being determined for these parameters. Thus, the tradeoff from using narrowband operations to monitor for reference signals is less power consumption per TTI but at the cost of inaccurate measurements.

It should be noted that depending on a variety of factors, there may be a plurality of narrowband regions defined within the carrier bandwidth for both uplink and downlink communications. The carrier bandwidth, including narrowband regions, may include a plurality of subbands. A subband may include a plurality of resource blocks (RB) and a RB may carry the reference signals transmitted by the eNB 122A. Thus, a narrowband and a subband may be identified by a numerical measure of their corresponding range and/or their position within the carrier bandwidth. However, it should be noted that reference to a subband and a RB is merely for illustrative purposes and different networks may categorize portions of bandwidth in different ways. It should be further noted that the use of reference signals is merely for illustrative purposes and different networks may refer to reference signals in a different manner (e.g. tones, symbols, etc.) Thus, the UE 110 may utilize any type of indication to perform measurements.

Figure 2:
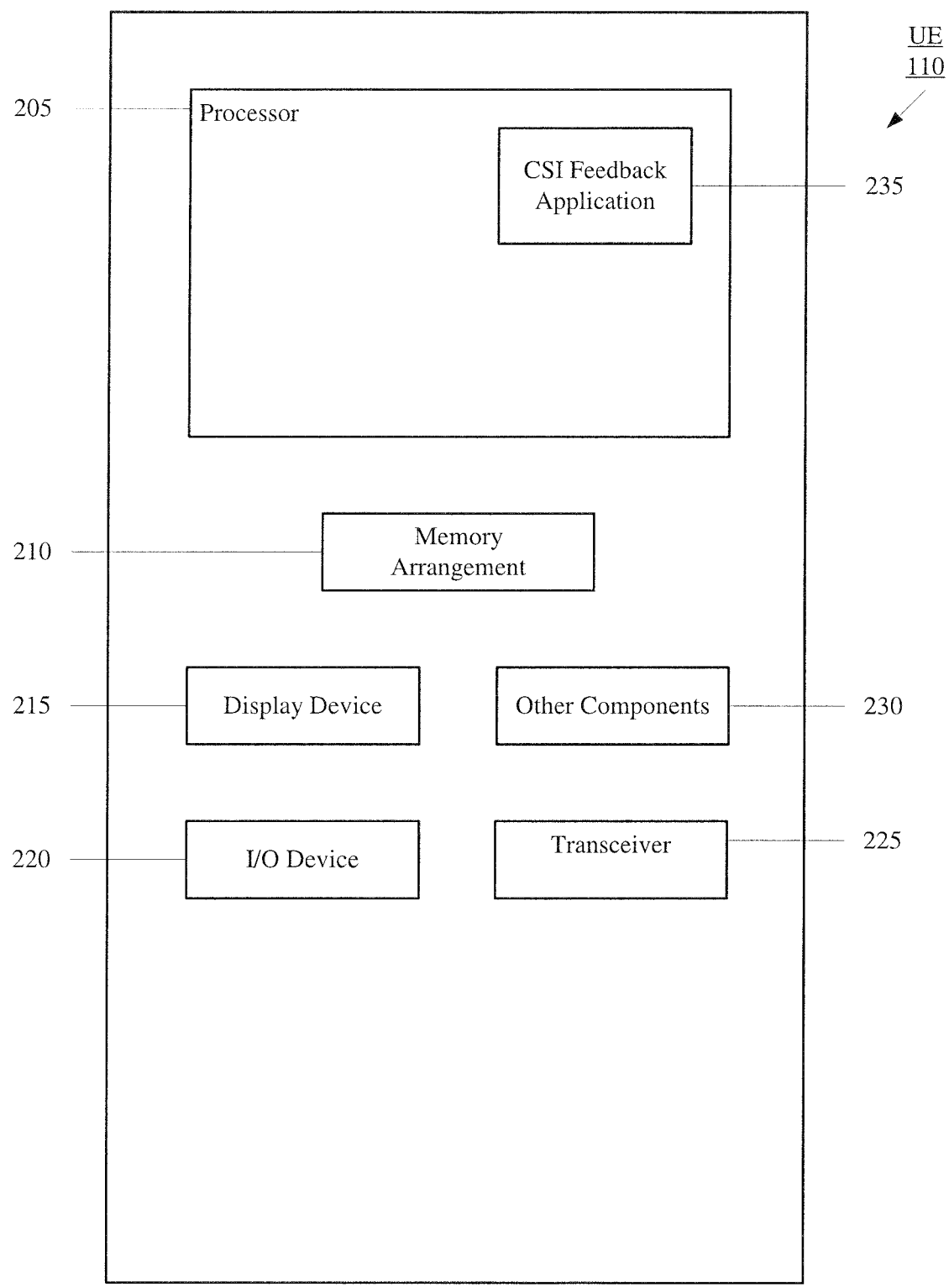
FIG. 2 shows a user equipment according to the various exemplary embodiments described herein.

FIG. 2 shows an exemplary UE 110 according to various exemplary embodiments. The UE 110 may be any electronic component that is configured to connect to a network and perform wireless functionalities. For example, the UE 110 may be a portable device such as a phone, a smartphone, a tablet, a phablet, a laptop, a wearable computing device, an Internet of Things (IoT) device (e.g., Category-M or Category M1), Machine-Type Communication (MTC) devices, enhanced MTC (eMTC) devices, etc. In another example, the UE 110 may be a stationary device such as a desktop terminal. The UE 110 may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, etc.

The processor 205 may be configured to execute a plurality of applications of the UE 110. For example, the applications may include a CSI feedback application 235. The CSI feedback application 235 may be configured to determine a variety of different measurements such as a determining a number of RBs to monitor, performing CSI related measurements (e.g. SNR, RSRP, RSRQ, RSSI, etc.)

Further, the CSI feedback application 235 may generate a CSI feedback report. Additionally, the CSI feedback application 235 may be configured to make measurements during narrowband operations. Those skilled in the art will understand how these measurements may be determined using any suitable calculation or algorithm.

It should be noted that the CSI feedback application 235 being an application (e.g., a program) executed by the processor 205 is only exemplary. The functionality associated with the application may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. In addition, in some UEs, the functionality described for the processor 205 is split among two processors, a baseband processor and an applications processor. The exemplary embodiments may be implemented in any of these or other configurations of a UE. For illustrative purposes, the processor 205 may be considered to be a baseband processor.

The memory 210 may be a hardware component configured to store data related to operations performed by the UE 110. As will be described in further detail below, the memory 210 may store data that corresponds to favorable CSI feedback decisions. This data may be stored and combined over time to enable the UE 110 to perform proactive CSI feedback decisions. For example, the UE 110 may be able to query the memory 210 via input parameters and determine CSI feedback decisions based on the outputted information. However, the use of the memory 210 is only exemplary and the UE 110 may store this data within another component or module within the UE 110 or in a component that is external to the UE 110.

The transceiver 225 may be a hardware component configured to exchange data with the eNB 122A. For example, the transceiver 225 may be configured to receive reference signals that are transmitted by the eNB 122A within the overall bandwidth of the LTE-RAN 122. Further, the transceiver 225 may enable communication with the LTE-RAN 122 or with other electronic devices directly or indirectly through the LTE-RAN 122 to which the UE 110 is connected. The transceiver 225 may operate on a variety of different frequencies or channels (e.g., set of consecutive frequencies). Thus, an antenna (not shown) coupled with the transceiver 225 enables the transceiver 225 to operate on the LTE frequency band.

As noted above, the processor 205 may be a baseband processor. The baseband processor 205 may designate which RBs the UE 110 may monitor, perform subsequent measurements on reference signals received via the transceiver 225. Accordingly, the baseband processor 205 may include a receiver unit, RB monitoring unit, a measurement unit, a tracking unit, etc. having the capability to utilize narrow bandwidth operations. The receiver unit may be configured to calculate a log likelihood ratio (LLR) and decode based on a received LLR. The receiver unit may also be configured to perform Hybrid Automatic Repeat Request (HARQ) operations (e.g., HARQ combine). The RB monitoring unit may be a component of the CSI feedback application 235 and configured to determine which RBs within the entire bandwidth of the LTE-RAN 122 to monitor and when to monitor them. The measurement unit may also be a component of the measurement application 235 configured to estimate a SNR, a RSRP, a RSSI, a RSRQ, a CQI, a RI, a PMI, etc. The tracking unit may be configured to track an automatic frequency correction (AFC), an automatic gain control (AGC), and a time to live (TTL).

As mentioned above, the exemplary embodiments may relate to a UE 110 that performs aperiodic CSI feedback or periodic CSI feedback. CSI feedback may be based on CSI measurements and may indicate how good or bad a communication channel is at a specific time. Thus, CSI measurements may indicate a channel quality. As described above, CSI measurements may be based on reference signals transmitted by the eNB 122A and received by the UE 110. The eNB 122A may broadcast reference signals during each TTI, whether or not there is data scheduled to be exchanged with the UE 110. Accordingly, the UE 110 may receive reference signals when monitoring for them at a specified time and frequency. A reference signal may be a Cell-Specific Reference Signal (CRS), a CSI Reference Signal (CSI-RS) or a Channel State Information-Interference Measurement (CSI-IM). However, it should be noted that the use of these types of reference signals is merely for illustrative purposes and the exemplary embodiments may utilize any type of signal that may indicate or be used to measure channel conditions.

The type of CSI feedback (e.g. aperiodic or periodic) is typically determined after the UE 110 has connected to the eNB 122A. The network may decide the type of CSI feedback based on information exchanged during radio resource control (RRC) protocols. However, it should be noted that the type of CSI feedback may be determined based on any type of exchange of data between the UE 110 and the network. Aperiodic CSI feedback may refer to a CSI report that is triggered by a specific occurrence. For instance, aperiodic CSI may be triggered based on the reception of a specific bit within a subframe corresponding to a control channel. Periodic CSI feedback may refer to a CSI report that is transmitted periodically with a specified time interval between transmissions. The specified time interval between transmission may be determined by the network based on the information exchanged during RRC protocols.

CSI feedback may be further categorized by a CSI reporting mode and a CSI transmission mode. For example, CEModeA for CAT-M1 aperiodic CSI feedback uses reporting Mode 2-0 which enables subband CQI reporting. This reporting enables the UE 110 to select a preferred subband and indicate the preferred subband within the CSI feedback for subsequent communication scheduling performed by the eNB 122A. A person having ordinary skill in the art would understand that the type and mode of CSI feedback may correspond to a precoding matrix indicator (PMI) feedback. It would also be understood that PMI feedback corresponds to how data may be distributed to different antenna ports.

A CSI feedback report may be based on monitoring and measuring the entire band (e.g. the entire bandwidth range provided by the eNB 122A, the carrier bandwidth, etc.) and determining a single value for the entire band. Alternatively, the CSI feedback report may be based on subbands selected by the UE 110. A UE selected subband CSI feedback report may include CSI for a set of preferred subbands or each individual subband. The CSI feedback may be transmitted to the eNB 122A over a narrowband and may include indications of parameters such as, but not limited to, at least one CQI, a transport block size, a number of antennas corresponding to the UE 110, a Modulation and Coding Scheme (MCS), etc. An aperiodic CSI feedback report may be transmitted over a Physical Uplink Shared Channel (PUSCH). A periodic CSI feedback report may be transmitted over a Physical Uplink Control Channel (PUCCH) or the PUSCH depending on the scheduling of other subframes that may be transmitted over the narrowband.

The exemplary embodiments adaptively decide the number of RBs to monitor and measure for CSI feedback. For example, the UE 110 may receive a MPDCCH subframe over a narrowband. The MPDCCH subframe may contain control information that schedules subsequent UE 110 transmissions over the PUSCH. Further, the MPDCCH may also contain a bit that triggers an aperiodic CSI feedback report.

In response to the aperiodic CSI feedback trigger, the UE 110 may determine the number of RBs to monitor and measure for CSI feedback. The determination may be based on input parameters such as, but not limited to, a value indicating an assessment of the current channel quality based on SNR, RSRP and RSRQ (C), a value indicating an assessment of channel variation in frequency based on delay spread ($V_f$) or a value indicating an assessment in channel variation in time based on Doppler spread and Doppler Shift ($V_t$). However, it should be noted that the UE 110 may determine the number of RBs based on any parameter that corresponds to CSI feedback.

Certain assessments performed by the UE 110 and related to aperiodic CSI feedback may have specific correlations to an amount of bandwidth (e.g. subbands, RBs, etc.) that may be monitored and measured by the UE 110 to balance power and performance of aperiodic CSI feedback. For example, an assessment of the current channel quality (C) that results in a low value may indicate to the UE 110 that the scheduled subband is not providing a sufficient channel quality. Thus, a low (C) value may indicate that the UE 110 may monitor and measure a bandwidth range that is larger than the scheduled narrowband. By measuring a larger range, the UE 110 may determine which subband (e.g. a further subband either within the narrowband or outside the narrowband but within the entire band) may provide a replacement over the scheduled subband.

An assessment of channel variation in frequency based on delay spread ($V_f$) that results in a large frequency diversity may indicate that only monitoring the scheduled narrowband may result in the UE 110 being unable to obtain adequate reference signals to perform accurate CSI measurements. Thus, this may indicate that monitoring a bandwidth that is larger than the scheduled narrowband may ensure that reference signals effected by the frequency diversity are captured (e.g. monitored) and thus, accuracy of CSI measurements may be improved. This may eliminate a potential need for repetitions or retransmissions.

An assessment in channel variation in time based on Doppler spread and Doppler Shift ($V_t$) that results in a low value may indicate to the UE 110 that the measurements may require a larger portion of the subframe. Accordingly, the UE 110 may determine to measure a wider bandwidth (e.g. additional RBs) to ensure accurate CSI feedback measurements based on the larger portion of the subframe required.

Based on these assessments, the UE 110 may determine a specific number of RBs (e.g. a wider bandwidth) outside of the narrowband but within the entire band to monitor and measure for aperiodic CSI feedback. It should be noted that the above assessments are merely exemplary, and the UE 110 may determine to monitor and measure additional RBs based on a variety of parameters.

Therefore, based on the above assessments, the UE 110 may determine to monitor additional RBs or resource block groups (RBG) outside of the narrowband but within the entire band. Based on the monitored reference signals, the UE 110 may determine a CSI for each subband within the range of monitored RBGs and a CSI for the entire bandwidth occupied by the narrowband and additional RBs. Subsequently, the UE 110 may determine a preferred subband for future eNB scheduling. After, the UE 110 may transmit to the eNB 122A, over the PUSCH, the aperiodic CSI feedback report which may indicate the preferred subband determined by the UE 110. The UE 110 may repeat this process after each MPDCCH subframe received by the UE 110 that triggers aperiodic CSI feedback.

Figure 3:
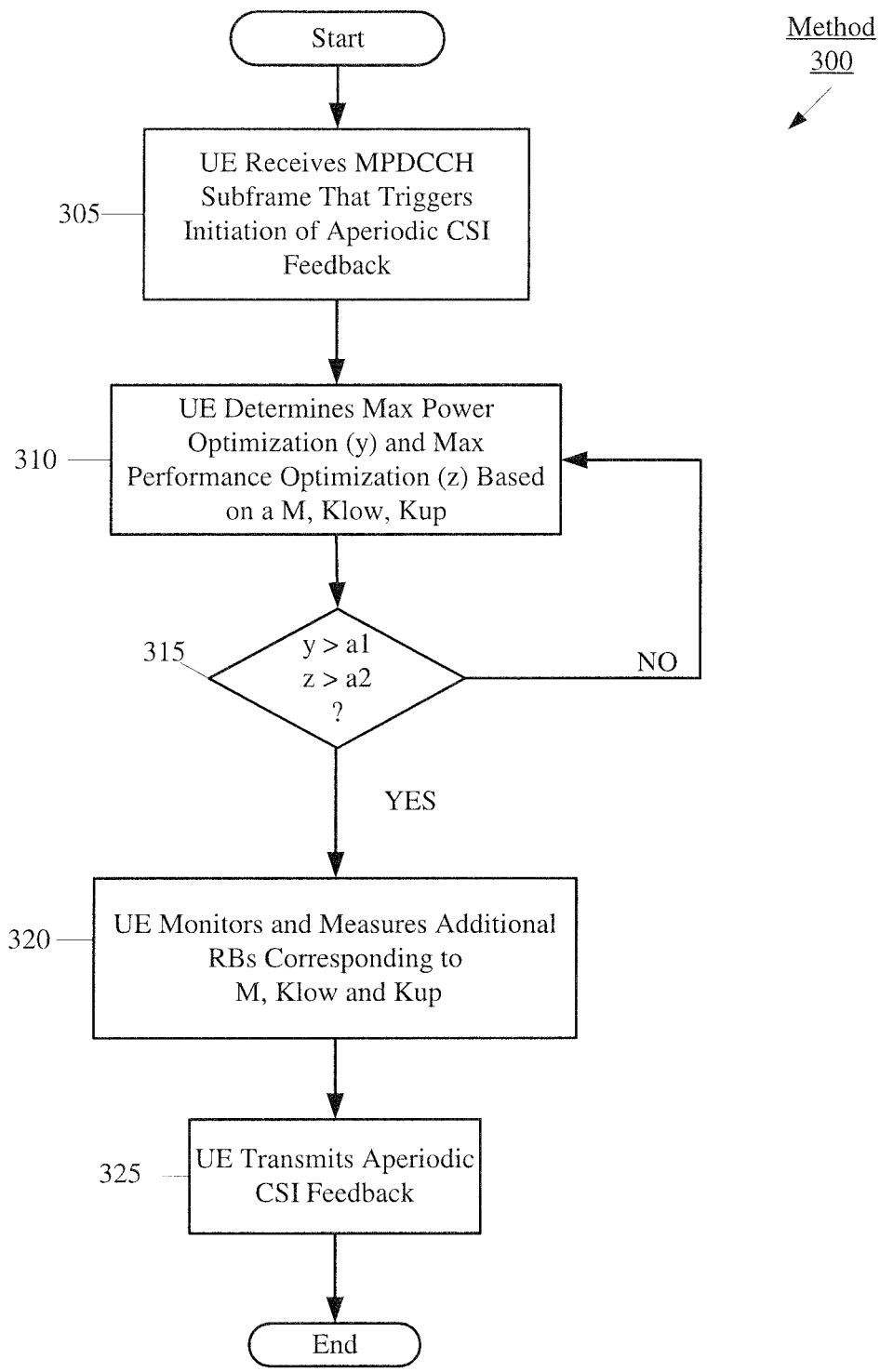
FIG. 3 shows a method for adaptively providing aperiodic CSI feedback according to various exemplary embodiments.

FIG. 3 shows a method 300 for the UE 110 to perform adaptive aperiodic CSI feedback. The method 300 relates to how the UE 110 determines a number of additional RBs to monitor and measure during aperiodic CSI feedback. The method 300 will be described with regard to the network arrangement 100 of FIG. 1 and the UE 110 of FIG. 2.

In 305, it may be considered that the UE 110 may be currently connected to the eNB 122A and has previously received, from the eNB 122A, a MPDCCH subframe that includes a bit that triggers the UE 110 to perform aperiodic CSI feedback. During the RRC protocol, the UE 110 and the eNB 122A may have exchanged messages and during the exchange of messages the eNB 122A may have indicated that upon reception of a specific bit in a MPDCCH subframe, the UE 110 is to initiate aperiodic CSI feedback.

In 310, the UE 110 determines a number of RBs to monitor and measure for aperiodic CSI feedback. For example, the UE 110 may determine a number of RBs to monitor and measure above the largest RB scheduled ($K_{up}$). The UE 110 may also determine a number of RBs to monitor and measure below the smallest RB scheduled ($K_{low}$). Additionally, the UE 110 may determine a particular subframe(s) (M), within a corresponding subband, to set with indices that indicate a time and frequency that corresponds to the additional RBs that are to be monitored and measured. In other words, (M) may serve as a reference for the additional RBs.

Figure 4:
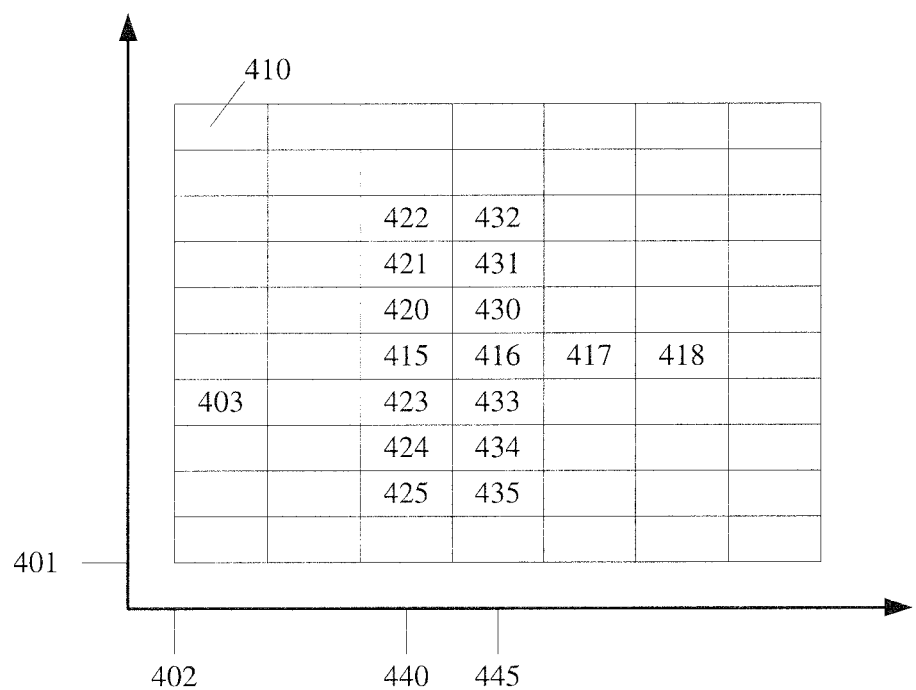
FIG. 4 shows a graph that provides an example of which resource blocks (RBs) the UE utilizes when providing aperiodic CSI feedback according to various exemplary embodiments.

To provide a specific example and referring to FIG. 4, which shows a graph that corresponds to which RBs within the entire band the UE 110 may monitor and measure for aperiodic CSI feedback. The y-axis 401 represents frequency and the x-axis 402 represents time. Each vertical column 410 represents a symbol (e.g. OFDM symbol) and includes a RBG that is equivalent to the width of a subband and each RBG may include at least one reference signal. RBs 415-418 represents a subband that is scheduled for the PUSCH. RB 418 represents the time and frequency in which the CSI feedback report is to be transmitted by the UE 110 to the eNB 122A. In this example, based on the aforementioned assessments and thresholds, the UE 110 has decided to monitor and measure six additional RBs for two consecutive subframes. Accordingly, the UE 110 determines that symbols 415 and 416 of the scheduled subband may be M and thus may be set with indices that represent the time and frequency of the extra RBs to be monitored and measured. Further, the UE 110 may determine that $K_{up}$ is equal to three RBs 420-422 for time 440 and three RBs 430-432 for time 445 and the UE 110 may determine that $K_{low}$ is equal to three RBs 423-425 for time 440 and three RBs 433-435 for time 445. Therefore, during time 440 which corresponds to the duration of RB 415 within the subband the UE 110 has determined to monitor and measure six RBs 420-425 that are outside the scheduled subband and during time 445 which corresponds to the duration of RB 416 within the subband the UE 110 has determined to monitor and measure six additional RBs 430-435 that are outside the scheduled subband.

Returning to 310, the exemplary embodiments may determine a number of additional RBs to monitor and measure for aperiodic CSI feedback. For instance, using a set of M, $K_{up}$ and $K_{low}$ the UE 110 may determine the RF and baseband processor 205 power (P) for receiving K number of extra RBs per subframe. Further, as mentioned above, the UE 110 may also determine the following values: a value indicating an assessment of the current channel quality based on SNR, RSRP and RSRQ (C), a value indicating an assessment of channel variation in frequency based on delay spread ($V_f$) and a value indicating an assessment in channel variation in time based on Doppler spread and Doppler Shift ($V_t$).

The UE 110 may use these values to determine a maximum power optimization (y) for the set of M, $K_{up}$ and $K_{low}$. For example, maximum power optimization (y) may be determined by the difference of a power saving estimation function (F) and a power cost mapping function (G). The power saving estimation function (F) may include an assessment of the current channel quality based on SNR, RSRP and RSRQ (C), a value indicating an assessment of channel variation in frequency based on delay spread ($V_f$), a value indicating an assessment in channel variation in time based on Doppler spread and Doppler Shift ($V_t$) and M. The power cost mapping function (G) may include RF and baseband processor 205 power (P) for receiving K number of extra RBs per subframe and (M). An exemplary determination of y may be seen below in equation 1.

$$y=F(C,V_t,V_f,M)-G(P,M) \quad \text{Equation 1:}$$

Additionally, the UE 110 may use these values to determine maximum performance optimization for a set of M, $K_{up}$ and $K_{low}$. Maximum performance optimization (z) may represent, but is not limited to, throughput. For example, performance optimization may be determined based on a function of performance enhancement estimation (J) that includes a value indicating an assessment of the current channel quality based on SNR, RSRP and RSRQ (C), a value indicating an assessment of channel variation in frequency based on delay spread ($V_f$), a value indicating an assessment in channel variation in time based on Doppler spread and Doppler Shift ($V_t$) and (M). An example of the function may be seen below as equation 2.

$$z=J(C,V_t,V_f,M) \quad \text{Equation 2:}$$

In 315, for a set of M, $K_{up}$ and $K_{low}$, the resulting maximum power optimization (y) is compared to a predetermined activation threshold ($a_1$) and the resulting maximum performance optimization (z) is compared to a predetermined threshold ($a_2$). If a set of M, $K_{up}$ and $K_{low}$ satisfies the predetermined activation thresholds ($a_1$) and ($a_2$) then the set of M, $K_{up}$ and $K_{low}$ may be used to specify the number of additional RBs the UE 110 may monitor and measure for aperiodic CSI feedback. If the set of M, $K_{up}$ and $K_{low}$ fails to satisfy the predetermined activation thresholds ($a_1$) and ($a_2$) then the method 300 may return to 310. Alternatively, a UE 110 may determine a plurality of sets of M, $K_{up}$ and $K_{low}$ simultaneously and if a set of M, $K_{up}$ and $K_{low}$ fails to satisfy the predetermined activation thresholds ($a_1$) and ($a_2$) the set of M, $K_{up}$ and $K_{low}$ may be discarded. If more than one set of M, $K_{up}$ and $K_{low}$ satisfies the predetermined activation thresholds ($a_1$) and ($a_2$) then the UE 110 may determine to use the set of M, $K_{up}$ and $K_{low}$ that produces the largest y and z values (there may also be other manners of determining which set to use). For example, the UE 110 may weigh one of the y or z values more than the other or only utilize a single predetermined threshold in making a determination regarding a set of M, $K_{up}$ and $K_{low}$.

Prior to comparing y or z to the respective activation threshold, the values may be processed by a filter to account for noise and ensure smoothness. For example, the filter may be a finite impulse response (FIR) filter or an infinite impulse response (IIR) filter. It should be noted that the use of an FIR or IIR filter is merely exemplary and the values may be processed by any type of filter that accounts for noise or ensures smoothness.

As mentioned above, certain assessments performed by the UE 110 may have specific correlations to the amount of bandwidth (e.g. additional RBs) that may be monitored and measured. For instance, a low value indicating an assessment of the current channel quality based on SNR, RSRP and RSRQ (C), may indicate to the UE 110 that the UE 110 may want to switch subbands and thus, the UE 110 may want to monitor and measure a larger bandwidth. A large value indicating an assessment of channel variation in frequency based on delay spread ($V_f$) may indicate a larger frequency diversity and thus, the UE 110 may want to measure a larger bandwidth. A small value indicating an assessment in channel variation in time based on Doppler spread and Doppler Shift ($V_t$) may indicate that the CSI feedback may be applicable for a longer duration and thus, the UE 110 may want to measure a larger bandwidth. Based on these correlations a power saving estimation function (F) is shown below in example 1, a power cost mapping function (G) is shown below in example 2 and a performance enhancement estimation function (J) is shown below in example 3. It should be noted that example 3 includes constants $w_i$ that depend on M, $K_{up}$ and $K_{low}$.

$$F = \frac{K_1}{V_t + K_0} + K_2 V_f - K_3 C \quad \text{Example 1}$$

$$G = K_4 P \cdot |M| + K_5 \quad \text{Example 2}$$

$$J = \frac{w_1}{V_t + w_0} + w_2 \min(V_f, V_0) + w_3 M - w_4 C \quad \text{Example 3}$$

In 320, for the determined set of M, $K_{up}$ and $K_{low}$ the UE 110 may monitor and perform CSI feedback measurements. Subsequently, within the range of RBs corresponding to the determined set of set of M, $K_{up}$ and $K_{low}$ the UE 110 determines the subband with the highest CSI measurements and the selects that subband as the preferred subband to be reported to the eNB 122A. The UE 110 may also determine a CSI for the band formed by the set of M, $K_{up}$ and $K_{low}$.

The UE 110 may store favorable subband CSI determinations corresponding to a set of M, $K_{up}$ and $K_{low}$. The UE 110 may utilize an aggregation of the stored values over time to facilitate the determination to initiate proactive CSI feedback. For example, the UE 110 may query the memory arrangement 210 with a specific parameter or a specific plurality of parameters and the UE 110 may be mapped to a corresponding set of M, $K_{up}$ and $K_{low}$.

In 325, the UE 110 transmits the aperiodic CSI feedback report to the eNB 122A. This report may include, but is not limited to, a preferred subband and a corresponding CSI. Subsequently, the eNB 122A may determine communication scheduling for the UE 110 based on the CSI feedback.

As already described above, FIG. 4 shows a graph 400 that illustrates which RBs the UE 110 may monitor and measure for aperiodic CSI feedback based on a set of M, $K_{up}$ and $K_{low}$. The y-axis 401 represents frequency and the x-axis 402 represents time. Initially, the UE 110 may receive a MPDCCH subframe 403 at a first time. The MPDCCH subframe 403 may contain control information that schedules the subsequent use of the PUSCH and a bit that triggers the initiation of an aperiodic CSI feedback over the PUSCH during RB 418.

Here, based on the assessments and thresholds mentioned above, the UE 110 has determined that the symbols at times 440 and 445 serve as M and thus, RBs 415 and 416 are set with indices that represent time and frequency of the additional RBs. Further, the UE 110 may determine that $K_{up}$ is equal to three RBs 420-422 for time 440 and three RBs 430-432 for time 445 and the UE 110 may determine that $K_{low}$ is equal to three RBs 423-425 for time 440 and three RBs 433-435 for time 445. Therefore, during time 440 which corresponds to the duration of RB 415 within the scheduled subband, the UE 110 has determined to monitor and measure six RBs 420-425 in addition to the scheduled subband and during time 445 which corresponds to the duration of RB 416 within the scheduled subband, the UE 110 has determined to monitor and measure six additional RBs 430-435 in addition to the scheduled subband.

As mentioned above, the exemplary embodiments may also apply to periodic CSI feedback. For example, the exemplary embodiments may determine a bandwidth to monitor that is less than the entire band while maintaining sufficient CSI measurement accuracy.

Certain assessments performed by the UE 110 and related to periodic CSI feedback may have specific correlations to an amount of bandwidth (e.g. subbands, RBs, etc.) that may be monitored and measured by the UE 110 that is less than the entire band while still maintaining sufficient CSI measurement accuracy. For example, a UE 110 may determine a block error ratio (BLER) (E), which represents a ratio of the number of erroneous blocks received to the total number of blocks sent and may indicate how successful data transmission at the physical layer. In LTE, the BLER target ($E_0$) is typically about 10%. The UE 110 may compare the BLER (E) to the BLER target ($E_0$). If the BLER (E) is close to the BLER target ($E_0$) this may indicate to the UE 110 that past CSI measurements are reliable because past CSI measurements have produced scheduling in accordance with typical LTE performance. If past CSI measurements are reliable this may indicate to the UE 110 that less bandwidth may be used to monitor and measure for current CSI feedback.

An assessment of the current channel quality (C) that results in a high value may indicate to the UE 110 that the scheduled subband is providing a sufficient channel quality. Thus, a high (C) value may indicate to the UE 110 that the UE 110 may monitor and measure a bandwidth range that is smaller than the entire band while maintaining sufficient CSI measurement accuracy.

An assessment of channel variation in frequency based on delay spread ($V_f$) that results in a smaller frequency selectivity may indicate to the UE 110 that less bandwidth may be used for monitoring and measuring because a smaller bandwidth may still provide accurate CSI feedback measurements. An assessment in channel variation in time based on Doppler spread and Doppler Shift ($V_t$) that results in a low value may indicate to the UE 110 that the measurements may use a smaller portion of the subframe. Thus, the UE 110 may determine to use less bandwidth for monitoring and measuring because a smaller bandwidth will still result in accurate CSI measurements.

Figure 5:
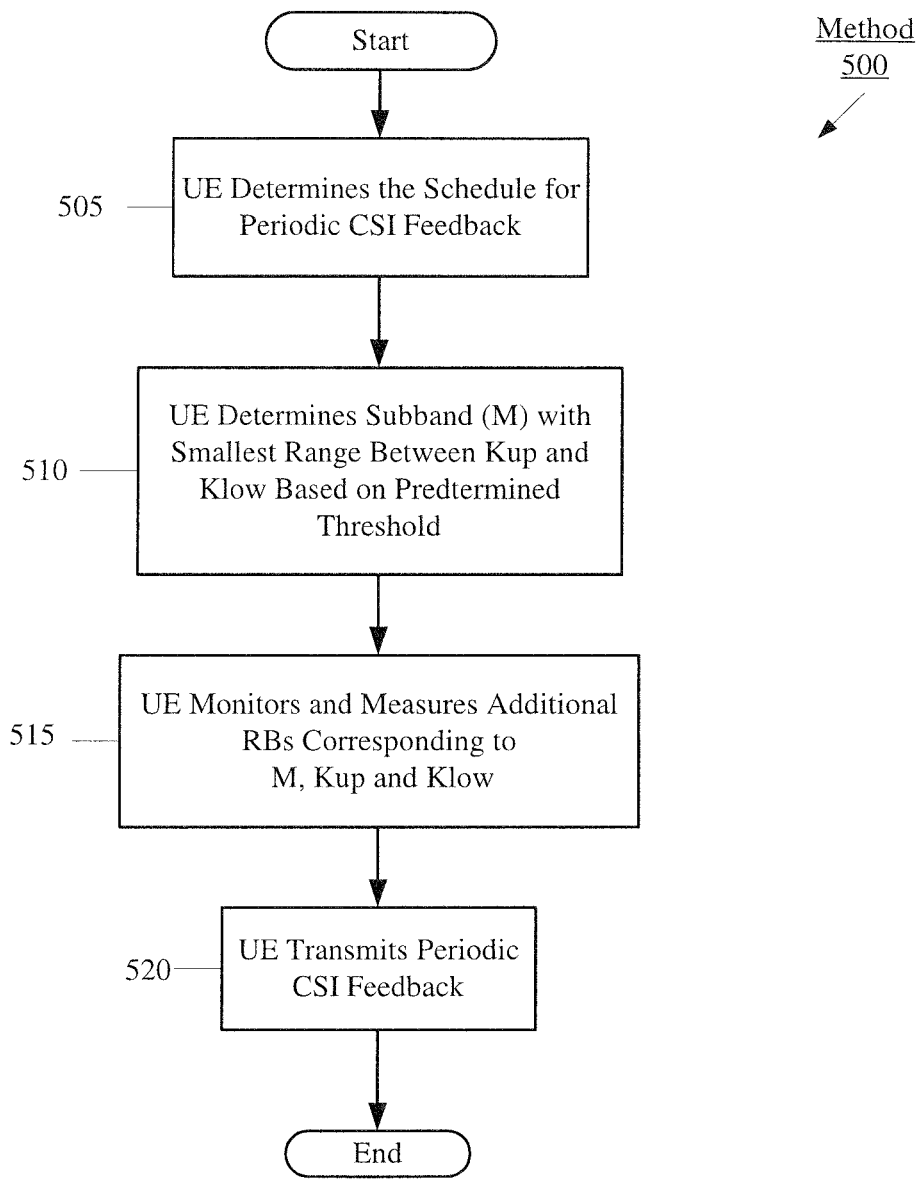
FIG. 5 show a method for adaptively providing periodic CSI feedback according to various exemplary embodiments.

FIG. 5 shows a method 500 for the UE 110 to perform adaptive periodic CSI feedback. The method 500 relates to how the UE 110 determines a number of RBs, less than the entire band, to monitor and measure while maintaining sufficient CSI measurement accuracy.

Initially, it should be noted that assessments made in adaptive aperiodic feedback may also be applicable to adaptive periodic feedback. However, since adaptive periodic feedback is attempting to monitor and measure less RBs while adaptive aperiodic feedback is attempting to monitor and measure more RBs the result of the assessment may have an opposite indication. Generally, aperiodic feedback is making these assessments to determine how bad the channel is because a bad channel indicates that more bandwidth may be used for current CSI monitoring and measuring to optimize current and future power and performance. In periodic feedback, these assessments are made by the UE 110 to determine how good the channel is because a good channel indicates that previous CSI feedback has been reliable and thus, less bandwidth may be used for CSI monitoring and measuring. Thus, the UE 110 may determine to use less power for current CSI monitoring and measuring while maintaining accurate CSI measurements.

In 505, it may be considered that the UE 110 may be currently connected to the eNB 122A. The UE 110 and the eNB 122A may have exchanged RRC messages and thus, the schedule of CSI periodic feedback may already have been determined.

In 510, the UE 110 determines a number of RBS to monitor and measure for periodic CSI feedback. Specifically, the UE 110 may attempt to determine for each of a plurality of respective subbands (M), the minimum value for the number of RBs above M ($K_{up}$) and the minimum value for the number of RBs below M ($K_{low}$), that may allow the UE 110 to maintain sufficient CSI measurement accuracy. Thus, the determination of these minimum values may be subject to whether a function of CSI measurement accuracy (D), based on a particular set of M, ($K_{up}$) and ($K_{low}$), satisfies a predetermined threshold ($a_3$).

The function of CSI measurement accuracy (D) may include an assessment of the current channel quality (C), an assessment of channel variation in frequency based on delay spread ($V_f$), an assessment in channel variation in time based on Doppler spread and Doppler Shift ($V_t$) and the block error ratio (BLER) (E). Thus, the UE 110 determines a plurality of Ms and for each M the UE 110 determines the minimum ($K_{up}$) and ($K_{low}$) based on a comparison to a predetermined accuracy threshold ($a_3$). For example, with respect to a particular M, a UE 110 may determine whether at least one set of ($K_{up}$) and ($K_{low}$) generates a D that satisfies $a_3$. An example of determining these minimum values may be seen below in equation 3. However, it should be noted that equation 3 is merely for illustrative purposes and the UE 110 may determine a minimum number of RBs outside of a particular M, but less than an entire band, to monitor for periodic CSI feedback, with respect to CSI measurement accuracy, in a variety of ways.

Minimize ($K_{up} \cdot K_{low} \cdot |M|$)

subject to: $D(C, V_t, V_f, E) > a_3$      Equation 3:

Prior to comparing D to $a_3$, the D and/or the values included in D may be processed by a filter to account for noise and ensure smoothness. For example, the filter may be a finite impulse response (FIR) filter or an infinite impulse response (IIR) filter. It should be noted that the use of an FIR or IIR filter is merely exemplary and the values may be processed by any type of filter that accounts for noise or ensures smoothness.

Regarding the function of CSI measurement accuracy (D), as mentioned above, certain assessments performed by the UE 110 and related to periodic CSI feedback may have specific correlations to an amount of bandwidth (e.g. RBs), outside of M but less than the entire band, that the UE 110 may monitor to produce accurate CSI measurements. Thus, certain assessments may be included in the function of CSI measurement accuracy (D).

For example, an assessment of the current channel quality (C) may indicate to the UE 110 that less bandwidth than the entire band may be monitored because the current channel quality is sufficient to produce accurate CSI measurements based on monitoring only a portion of the entire band. An assessment of channel variation in frequency based on delay spread ($V_f$) may indicate to the UE 110 that monitoring a portion of the entire band may provide CSI measurements that are sufficiently similar in accuracy to CSI measurements based on monitoring the entire band. An assessment in channel variation based on Doppler spread and Doppler shift ($V_t$) may indicate to the UE 110 that CSI measurements require a lesser portion of a subframe and thus, monitoring less than the entire band may result in sufficiently accurate CSI measurements. The BLER (E) may indicate to the UE 110 that past CSI measurements are reliable because past CSI measurements have produced scheduling in accordance with typical LTE performance and thus, monitoring only a portion of the entire band may result in sufficiently accurate CSI measurements. An example of the function of CSI measurement accuracy (D) based on the above described correlations is shown below in example 4. It should be noted that example 4 includes constants $s_i$ which can be tuned for different operating scenarios.

$$D=(s_0-s_1\max(V_f,V_0)-s_2\max(V_t,V_0)+s_3C)\cdot(1-E+E_0)) \quad \text{Example 4:}$$

It should be noted that while the exemplary embodiments are described with regard to a D that includes particular assessments (e.g. C, $V_t$, $V_f$, E), these particular assessments are merely for illustrative purposes the UE 110 utilize a combination of assessments that does not include one of the above particular assessments and/or includes a further assessment. Alternatively, the UE 110 may utilize single assessment or measurement to determine D. Thus, the UE 110 may determine a ($K_{up}$) and ($K_{low}$) for a particular M subject to any measure corresponding CSI measurement accuracy.

If M fails to have a corresponding ($K_{up}$) and ($K_{low}$) that satisfy the predetermined threshold ($a_3$) then the M value is discarded. If a plurality of Ms have a corresponding ($K_{up}$) and ($K_{low}$) that satisfy the predetermined threshold ($a_3$) then the UE 110 may select the M value having the smallest range between ($K_{up}$) and ($K_{low}$). Thus, the UE 110 will determine the subband M and a corresponding ($K_{up}$) and ($K_{low}$) that cover the smallest range of bandwidth (e.g. RBs) between them. This ensures that the UE 110 may reduce power for current CSI measurement while maintaining sufficient CSI accuracy.

In 515, the UE 110 monitors and performs CSI measurements on a bandwidth range (e.g. RBs) based on the determined M, ($K_{up}$) and ($K_{low}$). In periodic CSI feedback, the UE 110 may determine a CSI of the bandwidth range defined by M, ($K_{up}$) and ($K_{low}$). This is because periodic CSI reporting does not support preferred subband selection.

The UE 110 may store favorable CSI determinations corresponding to a set of M, ($K_{up}$) and ($K_{low}$). The UE 110 may utilize an aggregation of the stored values over time to initiate proactive CSI feedback. For example, the UE 110 may query the memory 205 with a specific parameter or a specific plurality of parameters and the UE 110 may be mapped to a corresponding set of M, ($K_{up}$) and ($K_{low}$).

In 520, the UE 110 transmits the periodic CSI feedback to the eNB 122A. This report may include, but is not limited to, CSI feedback report corresponding to the band defined by M, ($K_{up}$) and ($K_{low}$). A periodic CSI feedback report may be transmitted over a Physical Uplink Control Channel (PUSCH) or the PUSCH depending on the scheduling of other subframes that may be transmitted over the narrowband. Subsequently, the eNB 122A may determine communication scheduling for the UE 110 based on the periodic CSI feedback.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a user equipment (UE), wherein the UE is connected to a network that utilizes a first bandwidth for a plurality of network operations and assigns the UE a second bandwidth, within the first bandwidth, to utilize for exchanging communications with the network:
   determining a third bandwidth for monitoring for communications from the network and not being assigned for transmitting communications to the network, the third bandwidth being narrower than the first bandwidth and wider than the second bandwidth and including the second bandwidth;
   monitoring the third bandwidth for at least one reference signal transmitted by the network; and
   determining at least one value that corresponds to the connection between the UE and the network based on the at least one reference signal.

2. The method of claim 1, wherein determining the third bandwidth includes determining at least one subframe and wherein monitoring the third bandwidth corresponds to the at least one subframe.

3. The method of claim 1, further comprising:
   generating feedback that is based on the at least one value, wherein the feedback comprises a Channel State Information (CSI) report including at least a Channel Quality Indicator (CQI); and
   transmitting a feedback report to the network that includes the feedback.

4. The method of claim 1, wherein determining the third bandwidth is initiated by one of data received by UE from the network indicating that the feedback should be transmitted or based on a schedule indicating that the feedback should be transmitted.

5. The method of claim 1, wherein the second bandwidth comprises at least one first resource block and wherein determining the third bandwidth comprises:

determining at least one second resource block that is located at a frequency higher than the at least one first resource block; and determining at least one third resource block that is located at a frequency lower than the at least one first resource block.

6. The method of claim 5, wherein the at least one second resource block and the at least one third resource block are each a plurality of resource blocks that are consecutive during a time duration and a frequency range.

7. The method of claim 5, wherein determining the third bandwidth further comprises:

determining at least one of a power metric associated with monitoring the at least one second and third resource blocks; and determining a performance metric associated with monitoring the at least one second and third resource blocks.

8. The method of claim 7, wherein determining the power metric comprises:

estimating a power saving metric based on characteristics of a connection between the UE and the network; and estimating a power cost of monitoring for the at least one second and third resource blocks.

9. The method of claim 7, wherein determining the performance metric comprises:

estimating the performance metric based on characteristics of a connection between the UE and the network.

10. The method of claim 7, further comprising:

selecting a fourth bandwidth within the third bandwidth to utilize for communication with the network, wherein selecting the fourth bandwidth is based on-a channel quality indicator (CQI).

11. A user equipment (UE), comprising:

a transceiver configured to establish a connection with a cell of a network that utilizes a first bandwidth for a plurality of network operations and assigns the UE a second bandwidth, within the first bandwidth, to utilize for exchanging communications with the network; and a baseband processor connected to the transceiver and configured to:

for monitoring for communications from the network and not being assigned for transmitting communications to the network, the third bandwidth being narrower than the first bandwidth and wider than the second bandwidth and including the second bandwidth;

monitor the third bandwidth for at least one reference signal transmitted by the network; and determine at least one value that corresponds to the connection between the UE and the network based on the at least one reference signal.

12. The UE of claim 11, wherein the baseband processor is configured to determine the third bandwidth based on at least determining at least one subframe and wherein monitoring the third bandwidth corresponds to the at least one subframe.

13. The UE of claim 11, wherein the baseband processor is configured to generate feedback that is based on the at least one value, wherein the feedback comprises a Channel State Information (CSI) report including at least a Channel Quality Indicator (CQI).

14. The UE of claim 11, wherein the baseband processor is initiated to determine the third bandwidth by one of data received by the UE from the network indicating that the feedback should be transmitted or based on a schedule indicating that the feedback should be transmitted.

15. The UE of claim 11, wherein the second bandwidth comprises at least one first resource block and wherein the baseband processor is configured to determine the third bandwidth by determining at least one second resource block that is located at a frequency higher than the at least one first resource block and determining at least one third resource block that is located at a frequency lower than the at least one first resource block.

16. The UE of claim 15, wherein the at least one second resource block and the at least one third resource block are each a plurality of resource blocks that are consecutive during a time duration and a frequency range.

17. The UE of claim 15, wherein the baseband processor determines the third bandwidth by, at least, determining at least one of a power metric associated with monitoring the at least one second and third resource blocks and determining a performance metric associated with monitoring the at least one second and third resource blocks.

18. The UE of claim 17, wherein the baseband processor determines the power metric by, at least, estimating a power saving metric based on characteristics of a connection between the UE and the network and estimating a power cost of monitoring for the at least one second and third resource blocks.

19. The UE of claim 17, wherein the baseband processor determines the performance metric by, at least, estimating the performance metric based on characteristics of a connection between the UE and the network.

20. An integrated circuit included in a user equipment that has established a connection with a network that utilizes a first bandwidth for a plurality of network operations and assigns a second bandwidth, within the first bandwidth, to utilize for exchanging communications between the UE and the network, the integrated circuit comprising:

circuitry to determine a third bandwidth for monitoring for communications from the network and not being assigned for transmitting communications to the network, the third bandwidth being narrower than the first bandwidth and wider than the second bandwidth and including the second bandwidth;

circuitry to monitor the third bandwidth for at least one reference signal transmitted by the network; and circuitry to determine at least one value that corresponds to the connection with the network based on the at least one reference signal.

* * * * *